May 10, 1927.
R. C. BENNER
1,628,104
PROCESS OF MAKING SEPARATORS AND SEPARATOR STOCK
Filed March 28, 1923
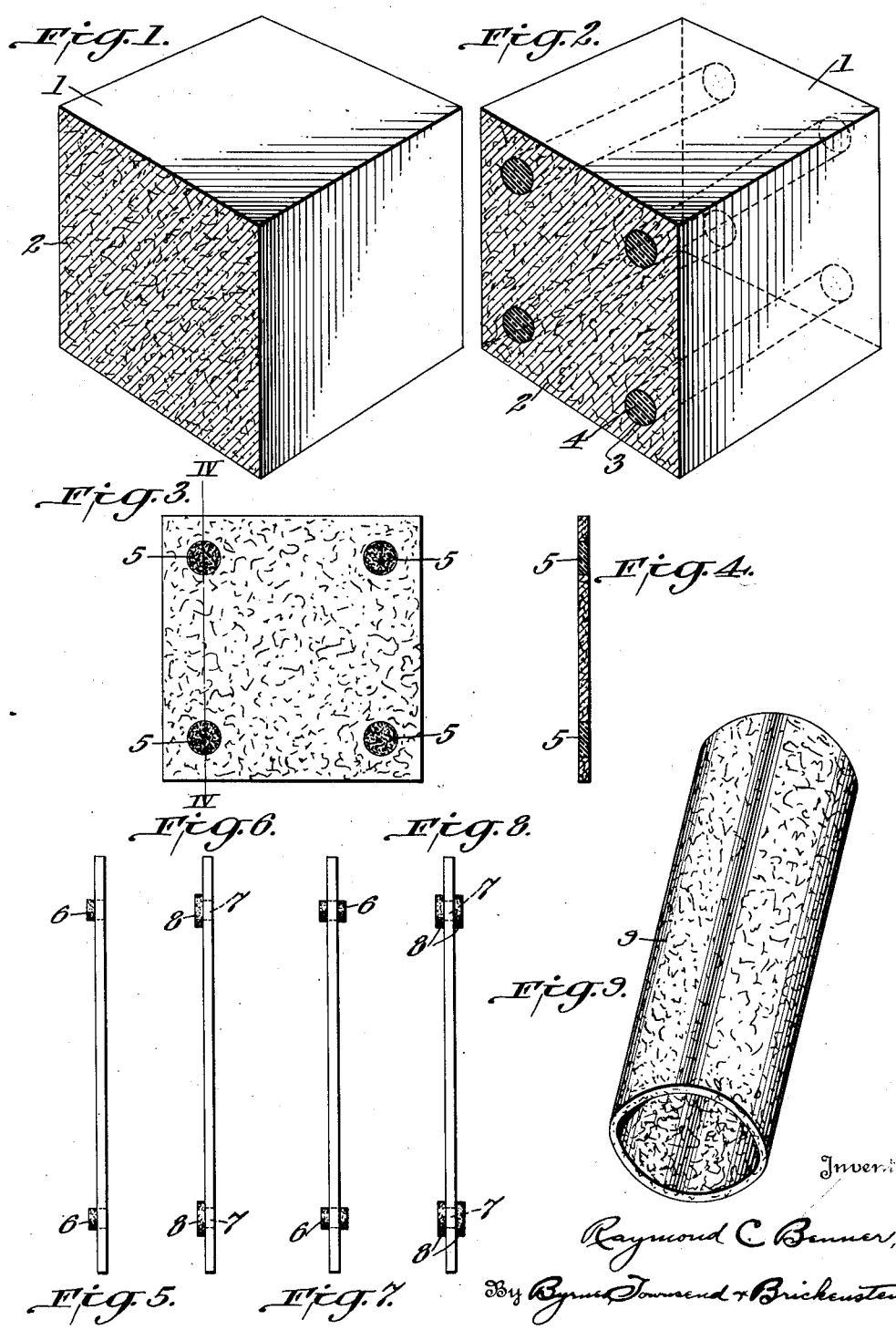
Inventor:
Raymond C. Benner,
By Byrne Townend + Brickenstein,
Attorneys Patented May 10, 1927.

1,628,104

UNITED STATES PATENT OFFICE.

RAYMOND C. BENNER, OF BAYSIDE, NEW YORK, ASSIGNOR TO THE PREST-O-LITE COMPANY, INC., OF NEW YORK, N. Y., A CORPORATION OF NEW YORK.

PROCESS OF MAKING SEPARATORS AND SEPARATOR STOCK.

Application filed March 28, 1923. Serial No. 628,375.

This invention relates to improvements in the manufacture of electrode separators from plastic-bonded fiber compositions of the general type described and claimed in my application Serial No. 601,411, filed November 16, 1922.

In the process of that application, the principal object is to provide a highly porous separator comprising fibers bonded together with rubber or equivalent nonconducting, acid-resistant material. This object is attained by mixing fibrous material, preferably cellulosic fibers, with a binding material, such as a plastic composition comprising rubber and a solvent. When rubber is used, vulcanizing agents are added to the batch, the material is rolled or otherwise shaped into the desired form, and is then vulcanized, producing a stiff, strong separator of the desired porosity.

According to the present invention, a plastic-bonded fiber composition like that described, or equivalent material, is molded into masses of such size and shape that they may conveniently be sliced into a plurality of sheets, or used in the extrusion, stamping, or molding of separators having other forms. If the masses are bonded with rubber, they are preferably partly vulcanized before being sliced or otherwise severed. Pressure sufficient to form a consolidated body should be applied to the composition prior to vulcanization. After the separator sheets are formed the vulcanization is completed, resulting in strong separators of high porosity. These have the advantages detailed in my application above referred to, including the distinctive feature of tortuous channels extending through the separator. Suitable material adapted to render the composition more porous, such as soluble or volatile salts, may be added in accordance with the disclosure in that application, or in other suitable ways.

It is desirable to perform the vulcanization in two steps, as described, because of the difficulty in securing uniform vulcanization throughout relatively large masses. Partial vulcanization is generally required at an early stage to permit the mass to retain its shape. When other plastics than rubber are used, for example celluloid or acid-resistant phenolic condensation products, they may be solidified and hardened in ways well understood in the art.

When the solvent evaporates from a rubber-bonded fiber composition of the kind referred to, it carries with it to the surface relatively large amounts of rubber which solidify there to form a "skin". On vulcanization this skin is converted into a material harder than the interior of the separator and serves as a protective framework. If the skin is not desired, its formation may be avoided by removing the bulk of the solvent before completing the mixing step. The composition may, for example, be thoroughly worked in a heated mixer. The amount of solvent remaining after this treatment is not sufficient to carry any large amount of solute to the surface, but the composition retains sufficient plasticity to be readily worked.

In general it is desirable to form blocks of regular cross section and to slice them along planes parallel to the direction in which pressure was applied. This method of severing the block is preferred because the pores which form tend to arrange themselves more or less in directions perpendicular to the direction of pressure. By slicing in the manner described, the pores are cut transversely and so provide openings through the resulting sheet. These openings are, however, of a more or less tortuous nature.

The invention will be further described in connection with the accompanying drawing, in which—

Fig. 1 is a vertical section through a plastic-bonded block of fibrous material, shown in perspective;

Fig. 2 is a similar view through a block having wear resisting inserts;

Fig. 3 is a front elevation of a separator cut from the block shown in Fig. 2;

Fig. 4 is a section on line IV—IV, Fig. 3;

Figs. 5 and 6 are side elevations of separators having inserts projecting from one side;

Figs. 7 and 8 are similar views, in which the inserts extend outwardly on both sides of the separator; and Fig. 9 is a perspective view of a tubular separator.

In these drawings, reference numeral 1 denotes a plastic-bonded fiber block of the type described. The fibers 2 may be of any suitable kind. They may, for example, consist wholly of sulfite pulp fibers of short length, or of woody fibers prepared by other processes, or they may be an admixture of such fibers with soluble or insoluble fibers of other kinds.

When very porous separators are prepared, by increasing the content of fiber or in other ways, the relative softness and fragility of the product are rather serious disadvantages. Such separators are not generally well adapted to withstand wear when used in vehicle batteries or for other hard service. I have discovered that these defects may be substantially avoided by providing wear-resisting areas in the separator surface.

A preferred method of forming such areas is as follows: After the rubber-fiber composition has been pressed into blocks, as described above, and before it has been completely vulcanized, holes 3 are punched in the block and a mixture 4, adapted to produce hard rubber on vulcanization, is forced into them. The block is then sliced or otherwise divided in any suitable manner and the severed parts are vulcanized. As shown in Fig. 3, the result is a separator having properly located discs 5 of hard material forming a substantially integral part of the relatively softer separator sheet proper. The discs 5 furnish adequate protection against the abrading or crushing action of the battery plates. The location of the inserts at the corners of the sparator is considered to be preferable but other disposition of them may be made.

Other materials than hard rubber may of course be used, and the procedure specified may be changed to meet varying conditions.

In the form of the invention shown in Figs. 5 to 8, the inserts are formed with their ends projecting beyond the face of the separator. By the provision of inserts of this type the separators are protected from crushing or abrasion, and are spaced from the plates so that circulation of electrolyte is facilitated. Four different types of inserts are shown by way of example. Numerous variations are obviously possible and the number and arrangement of the inserts may be varied as desired.

In the separators shown in Figs. 5 and 7, the insert consists of a protruding cylindrical body 6 secured in the separator. This may be done by simultaneously vulcanizing the separator and insert material to secure a union between them, or in other suitable ways. Figs. 6 and 8 show rivet-like inserts comprising a stem 7 and head 8 formed on one or both ends. The headed inserts are preferred because they do not require to be united with the sparator body. They may of course be so united, and in this case the heads are security against the displacement of the insert, should its connection with the separator be broken.

The preferred process of forming the protruding inserts is as follows: The separator is perforated to form an opening of suitable diameter and a plastic material is placed in the opening and extending beyond one or both of the surfaces of the separator. The protruding ends are expanded by compression in a hot press. They are then cooled under compression of a definite amount so that a uniform, predetermined thickness of the head is obtained. The thickness may of course be varied in accordance with the particular plate spacing desired. In my application Serial No. 628,376 filed March 28, 1923, Patent No. 1,495,568, I have shown and claimed similar inserts applied to silicated separators.

The bonded fiber composition may be formed into any desired shape. As illustrative of this, Fig. 9 shows a tubular separator 9. Such separators may be stamped from a block of the composition, molded, extruded or otherwise suitably formed.

I am aware that rubberized fabric, or alternate layers of fibrous material and rubber, have heretofore been pressed into blocks and sliced to form separators. The present invention is distinguished from this prior practice by the direct admixture of the individual fibers with the plastic. In this way a homogeneous mixture is obtained, which is not the case when alternate layers of material are consolidated. Further, the felted mass of fibers provide tortuous channels through the separator, instead of the relatively rectilinear pores which are characteristic of sliced rubber-bonded textile fabric. The chance of active material passing through the improved separators, or of crystals growing through them, is greatly diminished by the indirectness of the pores. Marked economy, as well as advantageous results, are characteristic of the use of unwoven fibers according to the present invention.

In some cases, also, sheets of impervious insulating material have been included in block structures of the prior type referred to, and the separators formed from the block have been corrugated to form ribs of the impervious material. By the present invention this procedure is simplified and improved by directly providing spaced inserts of limited area at suitable places on the separator.

I claim:

1. Process of making separator stock, comprising mixing fibrous material and a binder, molding the resulting mixture into a mass of suitable form for severing into separators, making openings in the mass, and securing a wear-resisting material in the openings.

2. Process of making separators, comprising forming a block of bonded fiber, making openings in the block, securing in the openings material adapted to resist wear, and severing the block along planes intersecting the openings, whereby separators having wear-resisting inserts are formed.

3. Process of making separator stock, which comprises forming a block of fibrous material in admixture with rubber and vulcanizing compounds adapted to produce a semi-hard mass, making openings in the block, placing in the openings a mixture adapted to produce hard rubber on vulcanization, and subjecting the composite material to a vulcanizing operation.

4. Process of forming plastic inserts in separators, comprising perforating the separator, placing in the perforation a mass of plastic material, so as to protrude therefrom, heating and compressing the protruding material to extend the same, and cooling the extended material while under compression.

5. Process of making separators, comprising forming a block of fibrous material in admixture with rubber and vulcanizing compounds adapted to produce the semi-hard mass, said block having transversely extending regions, composed of a mixture adapted to produce hard rubber on vulcanization, partially vulcanizing the block, severing the block along plains intersecting said transversely extending regions and completing the vulcanization of the plates so formed.

In testimony whereof, I affix my signature.

RAYMOND C. BENNER.